(12) United States Patent
Giesler et al.

(10) Patent No.: US 6,320,508 B1
(45) Date of Patent: Nov. 20, 2001

(54) ARRANGEMENT FOR AN ANTENNA RESONANT CIRCUIT FOR CONTACTLESS TRANSMISSION SYSTEMS

(75) Inventors: Thomas Giesler; Frank Böh, both of Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/274,391

(22) Filed: Mar. 23, 1999

(30) Foreign Application Priority Data

Mar. 24, 1998 (DE) .............................................. 198 12 728

(51) Int. Cl.[7] .................................................. G08B 13/14
(52) U.S. Cl. ................................... 340/572.7; 340/572.2; 340/572.4; 455/277.1
(58) Field of Search .............................. 340/572.7, 572.2, 340/572.4, 551; 455/277.1; 343/895, 701

(56) References Cited

U.S. PATENT DOCUMENTS

| | | | |
|---|---|---|---|
| 3,820,103 | * 6/1974 | Fearon | 340/572.2 |
| 4,302,846 | * 11/1981 | Stephen et al. | 340/572.2 |
| 5,729,236 | * 3/1998 | Flaxl | 455/277.1 |
| 5,923,251 | * 7/1999 | Raimbault et al. | 340/572.4 |

FOREIGN PATENT DOCUMENTS

0625832A1    11/1994    (EP) .

* cited by examiner

Primary Examiner—Jeffery A Hofsass

(57) ABSTRACT

The respective resonance frequencies of resonant circuits in the base station and the transponder in identification systems are tuned to a transmission frequency for the wireless transmission of data and energy. In order to achieve an as high as possible transmission efficiency, the resonant circuits must be very accurately tuned to the transmission frequency. Because these systems are subject to temperature fluctuations and other environmental conditions, and manufacture-inherent component tolerances also occur, it is difficult to ensure reliable operation within a tolerance range in which reliable data and energy transmission is possible. Extending this tolerance range would enhance the reliability of these systems. The tolerance range can be extended by increasing the power with which the resonant circuit operates. However, in the case of 100% tuning a field strength is then reached which is substantially larger than necessary for the data and energy transmission. Moreover, stronger drivers are then required. When voltage limitation is applied after the required field strength has been reached, the wider tolerance range is achieved without it being necessary to provide the high power. At the same time a constant field strength is realized across the voltage limitation range. The voltage limiting arrangement is connected parallel to a resonant circuit element. The advantages of such voltage limitation for antenna resonant circuits reside in the use of components with large tolerances and in the accompanying reduction of the system costs.

6 Claims, 3 Drawing Sheets

ARRANGEMENT FOR AN ANTENNA RESONANT CIRCUIT FOR CONTACTLESS TRANSMISSION SYSTEMS

BACKGROUND OF THE INVENTION

The invention relates to an arrangement for a system for the contactless transmission of data and/or energy between a base station, including an antenna resonant circuit, and a transponder.

The base station transmits data and energy to a transponder via an electromagnetic field. The highest transmission efficiency is achieved when the resonance frequency of the antenna resonant circuit is tuned to a transmission frequency which is defined by a generator in the base station and whereto the resonance frequency of the transponder resonant circuit is also tuned.

EP 0 625 832 A1 describes a system for the wireless transmission of data and energy in which the antenna resonant circuit is automatically tuned to a fixed transmission frequency by way of connectable capacitances.

Detuning of the antenna resonant circuit occurs due to temperature-induced drift phenomena in the elements of the resonant circuit or due to manufacture-related deviations. Consequently, the resonance frequency of the resonant circuit is no longer tuned exactly to the transmission frequency, so that the antenna current is reduced and hence the transmitted field strength also decreases. Such detuning could possibly preclude correct transmission of data and energy to the transponder, or could substantially reduce the distance that can be allowed between the base station and the transponder. In order to avoid these functional restrictions, either components having small tolerances must be used or the systems must be manually retuned. Complex circuits for automatic tuning of the transmission frequency could also be employed. Another possibility of ensuring reliable transmission is to increase the operating power of the system. However, stronger antenna drivers are then required; like the other possibilities, this increases the cost of the system.

When the resonance frequency of an antenna resonant circuit of the base station is accurately tuned to the transmission frequency, the impedance of the antenna resonant circuit consists only of the real ohmic resistance, so that the maximum current is reached and hence also the maximum field strength. The maximum current possible is limited by the antenna drivers and the power supply. Usually public rules are imposed as regards the maximum field strength. Antenna resonant circuits reach the field strength required for a data and energy transmission in a tolerance range. This tolerance range characterizes the range in which the resonance frequency may deviate from the transmission frequency without endangering reliable transmission. There is a measure for the maximum permissible deviation of the resonance frequency of the antenna resonant circuit from the transmission frequency. If the resonance frequency of the resonant circuit lies outside this tolerance range, transmission of data and energy cannot take place.

When the antenna resonant circuit is operated with a higher power, the current flowing and the maximum field strength increase if the antenna resonant circuit is tuned. The tolerance range for the resonance frequency in respect of the deviation from the transmission frequency is greater in antenna resonant circuits operating with a higher power than in antenna resonant circuits operating with less power. However, stronger drivers are required for the higher power. In addition to this additional expenditure, antenna resonant circuits operating with a higher power also generate a stronger electromagnetic field when the antenna resonant circuit is tuned, so that public rules might be violated.

SUMMARY OF THE INVENTION

Therefore, it is an object of the invention to provide an arrangement which generates a substantially constant and adequate field strength within a tolerance range, independently of the detuning of the resonance frequency or the transmission frequency.

This object is achieved as disclosed in the characterizing part of claim 1.

Reliable transmission is ensured when the antenna resonant circuit is tuned to the transmission frequency. Transmission of data and energy is possible even when the antenna resonant circuit is not tuned exactly to the transmission frequency of the system. The deviation from such exact tuning of the resonance frequency to the transmission frequency, for which transmission is still possible, is referred to as said tolerance range.

A resonant circuit operated with more power reaches a high field strength upon resonance. Such an increase of the field strength, however, is no longer necessary when the required field strength is reached. In order to avoid a further increase of the field strength, the voltage is limited after the necessary field strength has been reached. Because these systems usually utilize amplitude modulation which is suppressed by voltage limitation, the voltage is limited in one half-wave only. Such limiting is achieved by the arrangement which is connected parallel to an element of the antenna resonant circuit and limits the voltage in one half-wave. As a result of this limitation, the antenna current no longer increases strongly after a limit value has been reached so that, also in the case of a deviation of the resonance frequency of the antenna resonant circuit, the field strength is so high that reliable data and energy transmission is possible but public rules are not violated. The antenna drivers need not be proportioned so as to be larger, because the antenna current does not increase further when a limit value is reached. The resultant field strength remains constant across the range of the voltage limitation which lies within the tolerance range. A constant field strength is thus achieved, independently of the deviation of the resonance frequency from the transmission frequency in the range in which transmission of data and energy to the transponder is possible.

The arrangement according to the invention may also be considered as a circuit Q limiter, since the circuit Q of the resonant circuit inherently becomes smaller when the voltage across a resonant circuit element is limited. The circuit Q of a series resonant circuit is dependent on the ratio of the voltage across a resonant circuit element to the generator voltage at resonance. In the case of a parallel resonant circuit, the circuit Q is dependent on the ratio of the current flowing through a resonant circuit element to the applied current at resonance. When a resonant circuit has a high Q, the resonance increase becomes smaller in the case of slight detuning and the resultant field strength quickly decreases, so that reliable transmission of data and energy is no longer ensured. This ratio changes when the resonant circuit has a lower Q.

The limitation arrangement according to the invention is used in antenna series resonant circuits in the described manner. In the case of antenna parallel resonant circuits, a limitation arrangement is preferably connected in series with a resonant circuit element so as to limit the current flowing through said resonant circuit element.

A further advantage of resonant circuits having a low Q consists in the smaller relative phase shift occurring upon detuning, so that load modulation can be performed in a wider range. The frequently used envelope demodulation can also be applied in an extended range since, because of the lower Q of the resonant circuit, a phase shift occurs only in response to a degree of detuning which is higher than in the case of resonant circuits having a higher Q.

BRIEF DESCRIPTION OF THE DRAWING

Embodiments of the invention will be described in detail hereinafter with reference to the FIGS. Therein.

DESCRIPTION OF THE PREFERRED EMBODIMENTS

Figure 1:
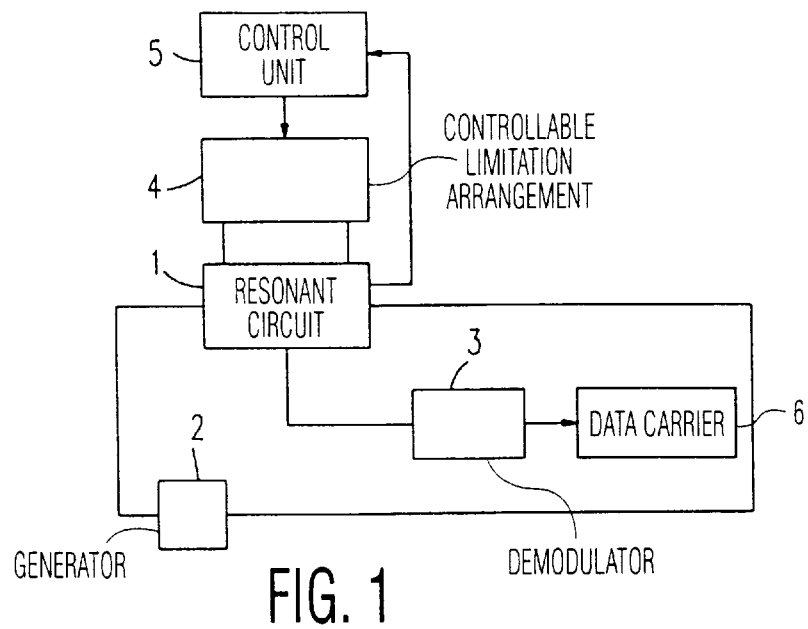
FIG. 1 shows a block diagram for voltage limitation.

FIG. 1 shows diagrammatically a resonant circuit 1, a generator 2, a demodulator 3, a controllable limitation arrangement 4 which is connected parallel to an element of the resonant circuit 1, and a control unit 5. A data carrier 6 may be coupled to the demodulator 3. The resonant circuit 1 is driven by a generator 2 and the limitation arrangement 4 limits the voltage in one half-wave and hence reduces also the circuit Q. The limitation arrangement 4 can be connected parallel to the capacitor or the coil of the resonant circuit. In the case of a series resonant circuit, one terminal of the arrangement is connected to a reference point between the resonant circuit coil and the resonant circuit capacitor.

The limitation arrangement 4 may have permanently adjusted limit values, on the basis of which the limitation is performed. These limit values are fixed, for example on the basis of breakdown voltages or threshold voltages of components.

When the limitation arrangement is controlled by a control unit 5, the limit values for the voltage limitation can be varied during operation. The voltage at the reference point at the relevant component participates in the circuit Q of the resonant circuit 1, so that after the measurement thereof by the control apparatus 5 and a calculated change of the limit values the circuit Q changes.

The demodulator 3 receives the signal present at the reference point and modulated by a transponder (not shown). The antenna resonant circuit receives, for example data from a transponder (not shown) in that the transponder loads its resonant circuit in conformity with the data to be transmitted. This data appears in the antenna resonant circuit in amplitude-modulated form. The amplitude-modulated signal is demodulated, for example by means of a peak value rectifier. Attention must be paid to the fact that the demodulation is possible in the half-wave which has not been limited. The data thus transmitted is applied to a processing unit which is not shown.

The limitation arrangement 4 is switched via the resonant circuit element of the resonant circuit 1 which has the smallest tolerance, since the most accurate limitation is thus achieved, i.e. the antenna current or the voltage at the resonant circuit are constant across the width of the tolerance range.

Figure 2:
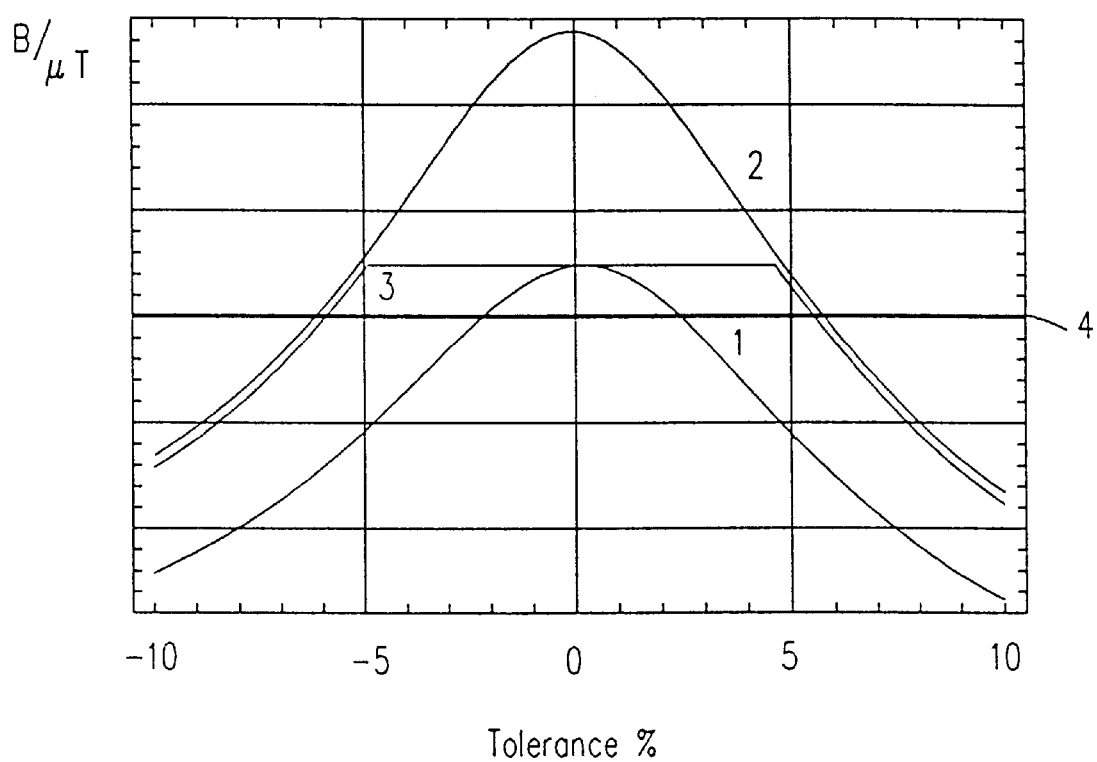
FIG. 2 shows the signal waveform in the case of voltage limitation.

FIG. 2 shows the resonance step-up of resonant circuits with and without limitation. The field strength is plotted on the ordinate. The line 4 characterizes the field strength required for reliable transmission. The percentual deviation of the resonance frequency of the antenna resonant circuit from the transmission frequency is plotted on the abscissa. When the resonance frequency of the antenna resonant circuit is tuned to the transmission frequency, the system has a tolerance of 0%. The curve 1 holds for a given drive power and for a resonant circuit Q reaching exactly the required field strength in the case of a tolerance of ±2%. In the case of a larger deviation, the field strength drops below the required field strength characterized by the line 4. The curve 2 shows the field strength variation of an antenna resonant circuit which is driven with a higher power. The maximum field strength that can be reached upon tuning to the transmission frequency of the system of the curve 2 is clearly higher than the maximum of the field strength of curve 1, so that the tolerance range in which transmission is possible is wider in the case of curve 2. Therefore, in order to achieve the required field strength the resonant circuit need not be tuned so accurately to the transmission frequency as the resonant circuit of curve 1. In the case of a resonant circuit which is tuned exactly to the transmission frequency, at this drive power the field strength is so large that it may exceed a legally imposed limit value. A requirement in this respect is the use of larger drivers which deliver a current corresponding to the large field strength. In order to prevent such a large field strength and to avoid the use of stronger drivers, the voltage at a resonant circuit element of the resonant circuit is limited.

The result of the voltage limitation is represented by the signal variation of the curve 3. Because no further increase of the field strength is required after the necessary field strength has been reached, the voltage is limited after this limit value has been reached, so that a constant, adequate field strength is achieved across the range of the voltage limitation. The large antenna current which would be required so as to reach the maximum will not be required in this case. The advantage of this arrangement resides in the fact that the systems need not be operated with the larger current required for the curve 2 and that, because of the limitation the wider tolerance range of the curve 2 is achieved nevertheless.

Consequently, components with larger tolerances can be used for such systems. The expenditure made for the limitation arrangement is very small. The system costs are reduced by this arrangement. At the same time a constant field strength is achieved within this range, independently of the tuning of the resonant circuit to the transmission frequency.

Figure 3:
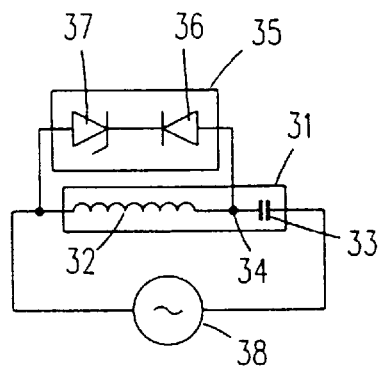
FIG. 3 shows a circuit arrangement with voltage limitation parallel to the coil.

FIG. 3 shows a series resonant circuit 31 which consists of a resonant circuit coil 32, constituting the antenna, and a resonant circuit capacitor 33 which is driven by a voltage generator 38. The limitation arrangement 35, consisting of a zener diode 37 and a diode 36 which is connected in the opposite sense relative to the zener diode 37, is connected parallel to the resonant circuit coil 32 in the present embodiment. The point between the resonant circuit coil 32 and the resonant circuit capacitor 33 constitutes the reference point 34. When the voltage across the zener diode 37 reaches the breakdown voltage, the voltage in one half-wave is limited. The other half-wave is not limited by the diode 36, being connected in the opposite sense relative to the zener diode 37. A constant antenna current is thus achieved throughout a tolerance range.

Data is exchanged between the transponder and the base station which are not shown. This data is modulated on the transmission signal. When the transmission signal received by the base station is limited in one half-wave, the modulated information is still present in the other half-wave. The limited transmission signal received is applied to a demodulator (FIG. 1).

Figure 4:
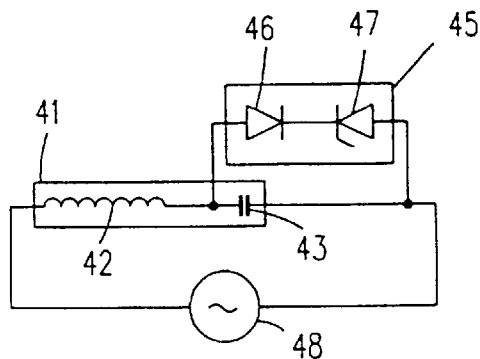
FIG. 4 shows a circuit arrangement with voltage limitation parallel to the capacitor.

In FIG. 4 the limitation arrangement 45, consisting of a zener diode 47 and a diode 46 which is connected in the reverse direction relative to the zener diode 47, is connected parallel to the resonant circuit capacitor 43, thus limiting the voltage across the capacitor.

Figure 5:
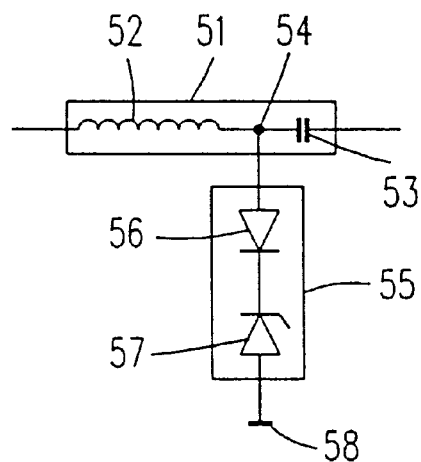
FIG. 5 shows a circuit arrangement for voltage limitation relative to ground.

In FIG. 5 the limitation arrangement 55 is connected between the reference point 54, situated between the resonant circuit coil 52 and the resonant circuit capacitor 53, and ground 58.

Figure 6:
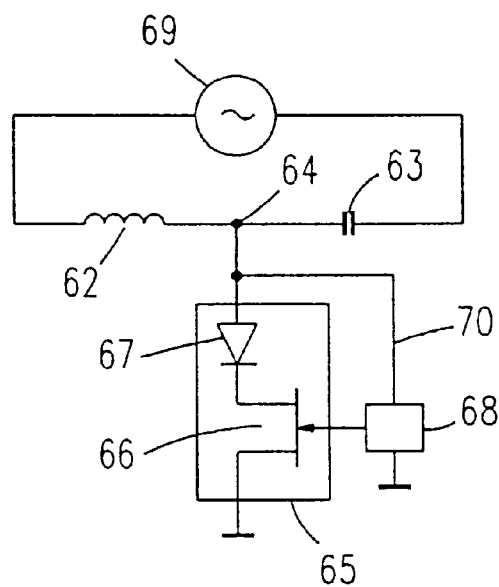
FIG. 6 shows a circuit arrangement for voltage limitation which consists of a field effect transistor, a diode and a microprocessor.

The circuit arrangement of FIG. 6 consists of an antenna resonant circuit with a resonant circuit coil 62, a resonant circuit capacitor 63 and an intermediate reference point 64 which is driven by the generator 69; it also includes the limitation arrangement 65 with a field effect transistor 66 and a diode 67, the field effect transistor 66 being driven by a microprocessor 68 so as to adjust the limit value whereto the half-wave is limited. The microprocessor 68 measures the voltage at the reference point 64 and subsequently calculates the limit value required for the voltage so as to achieve the necessary reduction of the circuit Q, thus increasing the width of the tolerance range.

An antenna parallel resonant circuit (not shown) is limited, for example by means of a constant current source which is connected in series with a resonant circuit element. It is in principle also possible to connect a limitation arrangement for a series resonant circuit in series with the series resonant elements and to connect also a limitation arrangement parallel to a resonant circuit element of an antenna parallel resonant circuit. The excess power not required, however, is then consumed in the limitation arrangement and the current consumption of the drivers of the base station is not minimized.

What is claimed is:

1. An arrangement for a system for contactless transmission of a signal between a base station, including a resonant circuit, and a transponder, comprising:
   a circuit connected parallel to an element of the resonant circuit in order to limit a voltage level in one half-wave of the signal when a predetermined limit value of the system is exceeded.

2. An arrangement as claimed in claim 1, wherein the circuit includes a zener diode and a diode which is connected in the reverse direction relative to the zener diode, the half-wave to be limited being defined by a switching direction of the zener diode.

3. An arrangement as claimed in claim 1, wherein the circuit includes a controllable transistor and a diode, the controllable transistor being a FET which can be driven by a microcontroller.

4. An arrangement as claimed in claim 1, wherein the resonant circuit is an antenna series resonant circuit, the circuit is connected between a reference point and a reference potential, the reference point being situated between the resonant circuit elements.

5. An arrangement as claimed in claim 1, wherein the resonant circuit is an antenna parallel resonant circuit, and the circuit is connected in series with a resonant circuit element in order to limit the current in one half-wave when the predetermined limit value is exceeded.

6. A reading apparatus for the contactless transmission of a signal to a data carrier coupled thereto, the reading apparatus including an antenna resonant circuit with an arrangement as claimed in one of the claim 1.

* * * * *